R. W. RUNDE.
SURFACE MILLING CUTTER.
APPLICATION FILED MAR. 13, 1919.
1,376,972.
Patented May 3, 1921.
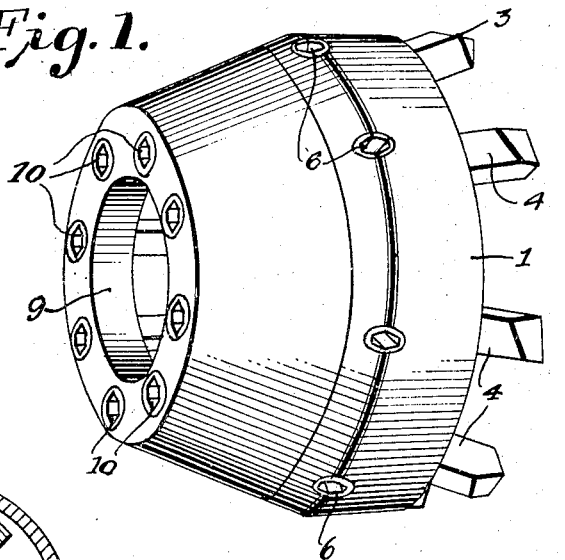
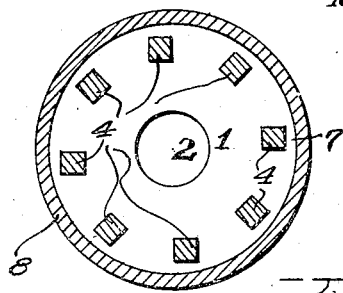
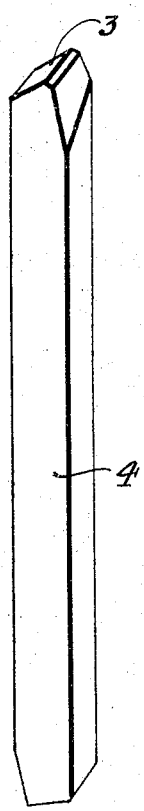
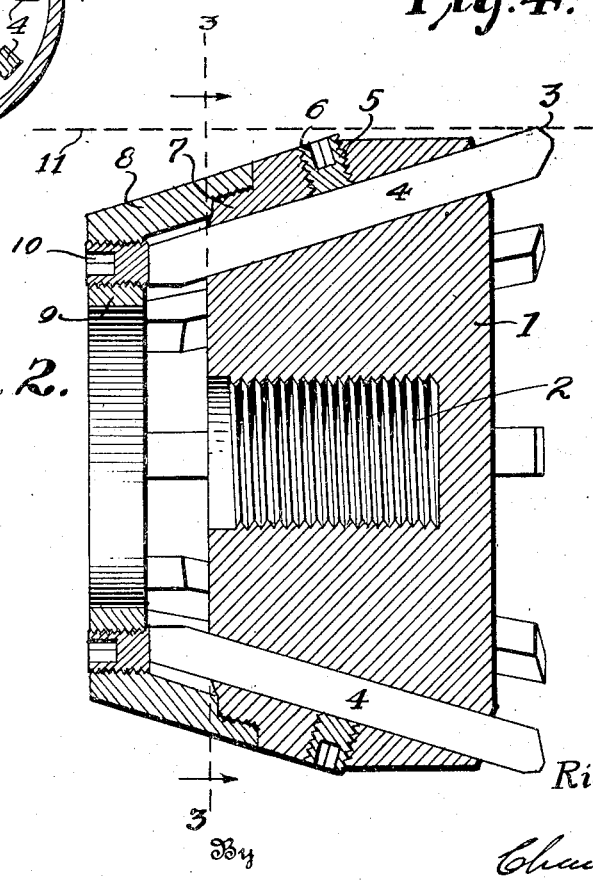
Inventor
Richard W. Runde.
By Charles E. Wiener
Attorney

UNITED STATES PATENT OFFICE.

RICHARD W. RUNDE, OF DETROIT, MICHIGAN.

SURFACE MILLING-CUTTER.

1,376,972.  Specification of Letters Patent.  Patented May 3, 1921.

Application filed March 13, 1919. Serial No. 282,327.

*To all whom it may concern:*

Be it known that I, RICHARD W. RUNDE, a citizen of the United States, residing at Detroit, county of Wayne, State of Michigan, have invented a certain new and useful Improvement in Surface Milling-Cutters, and declare the following to be a full, clear, and exact description of the same, such as will enable others skilled in the art to which it pertains to make and use the same, reference being had to the accompanying drawings, which form a part of this specification.

This invention relates to surface milling cutters, and its object is to provide a milling cutter having a series of tools arranged in the shape of a cone and solidly supported in such relationship that the rotatable head and tools carried thereby may be used either with the ends of the tools performing the cutting operation or the outer peripheral sides adjacent the ends, the purpose being to provide a tool and holder of such character that the diameter of a circle formed by the outer surfaces of the tools at the end is greater in diameter than the diameter of the head at any point. A further object of the invention is to provide a milling cutter of the character stated with the several cutters or tools positioned about the longitudinal axis of the head at an angle thereto and a cap or case for the rear ends of the cutters inclosing the same and provided with an adjusting device individual to each tool. These and other objects and the several novel features of the invention in its preferred form are hereinafter more fully described and claimed and shown in the accompanying drawings in which—

Figure 1 is a perspective view of a milling cutter embodying my invention.

Fig. 2 is an enlarged longitudinal section thereof showing the mode of supporting and adjusting the tools.

Fig. 3 is a cross section on line 3—3 of Fig. 2 and on a reduced scale.

Fig. 4 is a detail of one of the tools.

The device consists of a head 1 provided with a threaded bore or recess 2 attachable to a chuck or head of a milling machine, lathe, or other device. It is to be understood that the apertured recess 2 may be of various types corresponding to the type and character of chuck or device to which it is to be attached. The plug or head 1 is provided with a series of square apertures formed therein by broaching, these apertures being formed in the body of the head at an angle to the longitudinal axis of the head whereby the tools are arranged in the general form of a cone with the outer ends 3 of the tools 4 projecting somewhat above or beyond the outer periphery of the head as will be understood from Fig. 2. The head is provided with a series of threaded apertures 5 opening from the outer surface into the broached aperture for the tool 4 and a socket screw 6 is mounted therein engaging against the tool and preventing longitudinal displacement thereof in use. At the rear end the head is provided with a threaded shoulder 7 to receive a cap member 8 as will be understood from Fig. 2. This cap member is provided with an internal flange 9 extending over the converging ends of the tools 4 supported in the head, and the flange has a series of threaded apertures one for each tool provided with a socket screw or plug 10 engaging directly against the inner ends of the tools and by means of which the tool may be adjusted longitudinally of the aperture therefor in the head. In this manner an individual adjustment of each tool is secured forming a device that is of great strength and economical in construction.

In manufacture of the device, the head is first apertured and provided with the threaded shoulder 7, the cap member 8 then positioned thereon and the outer surface of the tool then finished. The apertures for the plugs are then provided in alinement with the broached apertures for the tools in the head. I am aware of milling devices of this character in which the tools are arranged in cone shaped relationship as herein described, but in all such previous devices, a clamp is utilized to retain the tool in position resulting in a construction that is weak in character as the tools continuously tend to loosen. By providing a broached square aperture in which the square tool is nicely fitted, the tool is rigidly supported by solid stock and the screw 6 is only utilized to prevent longitudinal movement of the tool and not to counteract strain imposed upon the tool in operation as is the case with a clamp or the like as heretofore used. Also, by the arrangement herein described the fastening devices and the adjusting devices are so positioned as to not only form a tool of neat and workmanlike appearance but in which there are no projecting parts and further the entire head and fastening device are so designed that all surfaces thereof are a less distance radially from the center than the radius of the circle formed by the outer peripheral cutting edges of the tools and thus the tool may be brought beneath a surface as indicated by the dotted lines 11 in Fig. 2 without possibility of any part of the head coming in contact with the surface.

Having thus briefly described my invention, what I claim is—

1. A surface milling cutter comprising a head substantially of the form of a truncated cone and having a threaded recess in the smaller end and a series of circularly arranged apertures extending therethrough near the periphery, the apertures each being formed at a similar angle to the longitudinal axis of the head, a cap secured to the small end of the head provided with an inturned flange providing a central opening, a cutting tool in each of the said apertures of the head, a similar series of adjusting screws in the cap plate, each engaging an end of a tool and providing for individual adjustment thereof longitudinally of the head, and means for securing the tools from longitudinal movement in the head.

2. A surface milling cutter comprising a head provided with a series of apertures arranged in a circle and a threaded recess in one end, the apertures each being formed at a similar angle to the longitudinal axis of the recess converging at the recessed end, a cap member secured to the recessed end of the head having a flange provided with a central opening, permitting introduction of a support in the threaded recess, a cutting tool in each of the said apertures, and an adjusting screw for each tool in the flange of the cap member, and means individual to each tool for preventing longitudinal movement in the aperture therefor.

3. A surface milling cutter comprising a head having a series of apertures formed therein, each at a similar angle to the longitudinal axis of the body, a tool for each aperture, the tools and apertures being formed in radial relation in the general shape of a cone, a set screw for each tool, and a cap member for the head having an internal flange, and a set screw in the flange for each tool providing an adjusting means individual thereto.

4. A surface milling cutter comprising a head, a series of apertures formed in the head in radial relation and at an angle to the longitudinal axis of the head, a series of tools, one for each aperture projecting through the forward end of the head, the outer peripheral edge of the tools at the end forming a circle greater than the outer diameter of the body, means for securing the tools from longitudinal movement, a cap member secured at the rear end of the head having an internal flange covering the converging rear ends of the tools, and an adjusting screw for each tool carried by the flange.

5. A surface milling cutter comprising a head circumferentially threaded at the rear end, a series of apertures formed in the head circumferentially about the longitudinal axis and each at the same relative angle thereto, the apertures converging toward the rear end, a series of tools fitting the apertures, means for securing the tools therein, a cap member in threaded relation with said rear end, and a series of set screws carried thereby, each in alinement with the rear end of a tool and providing an adjusting means individual thereto.

6. A surface milling cutter comprising a head substantially cone shaped in form and provided with an annular threaded terminal less in diameter than the diameter of the small end of the body, a series of apertures formed in the head circumferentially about the longitudinal axis and at the same relative angle thereto, a tool fitting in each aperture; means for preventing longitudinal movement of the tool in the aperture therefor, a cap member adapted to be threaded on said threaded end of the body having an outer surface coincident with the surface of the body and a centrally apertured internal flange, the body having a central recess into which a support may be introduced through the aperture of the cap, and an adjusting screw for each tool carried by the cap flange.

In testimony whereof, I sign this specification.

RICHARD W. RUNDE.